United States Patent [19]

Teixeira Filho et al.

[11] Patent Number: 5,611,327
[45] Date of Patent: Mar. 18, 1997

[54] AUTOMATIC CONTROL STOVE

[76] Inventors: Fabio L. Teixeira Filho, Rua Honorato Faustino, 164, Sao Paulo - SP, Brazil, 05462-060; Marcio D. L. Andreoni, Rua Tomé Raposo 70, Sao Paulo - SP, Brazil, 02022-060

[21] Appl. No.: 256,690
[22] PCT Filed: Jan. 21, 1993
[86] PCT No.: PCT/BR93/00003
 § 371 Date: Sep. 14, 1994
 § 102(e) Date: Sep. 14, 1994
[87] PCT Pub. No.: WO93/14350
 PCT Pub. Date: Jul. 22, 1993

[30] Foreign Application Priority Data

Jan. 21, 1992 [BR] Brazil ................................. 9200168

[51] Int. Cl.⁶ ................................................ F24C 3/00
[52] U.S. Cl. ...................... 126/39 R; 126/52; 126/39 G; 219/412; 219/414
[58] Field of Search ..................... 126/52, 39 G, 126/42, 39 R; 219/412–414

[56] References Cited

U.S. PATENT DOCUMENTS

| | | | |
|---|---|---|---|
| 3,889,875 | 6/1975 | Goodhouse | 235/61 A |
| 4,391,265 | 7/1983 | Chen | 126/52 |
| 4,492,336 | 1/1985 | Takata et al. | 126/39 G |
| 4,577,181 | 3/1986 | Lipscher et al. | 126/42 |
| 4,681,084 | 7/1987 | Grech | 126/52 |
| 4,946,096 | 8/1990 | Ballard et al. | 307/66 |
| 4,977,353 | 12/1990 | Helal et al. | 307/66 |
| 5,171,974 | 12/1992 | Koether et al. | 219/413 |
| 5,429,111 | 7/1995 | Akamatsu | 126/52 |
| 5,438,180 | 8/1995 | Eisenbrandt et al. | 219/413 |

FOREIGN PATENT DOCUMENTS

| | | | |
|---|---|---|---|
| 173855 | 3/1986 | European Pat. Off. . | |
| 2604922 | 8/1977 | Germany | 126/39 R |
| 62723 | 3/1986 | Japan | 126/52 |
| 129620 | 6/1987 | Japan | 126/52 |

OTHER PUBLICATIONS

Patent Abstracts of Japan, vol. 10, No. 301 (M–525) [2357] 14 Oct. 1986.

*Primary Examiner*—Carroll B. Dority
*Attorney, Agent, or Firm*—Darby & Darby, P.C.

[57] ABSTRACT

A stove having a plurality of burners (1) which is under the control of a computer that has one or more cooking control programs to control the activation, time of operation and heat output of a selected burner. The user of the stove, a utensil and the stove have components of a transmitter/receiver system that permits burner actuation through the computer only when the user and utensil are authorized.

The stove includes subsystems that supply information to the computer: a flame sensing system (C); a time regulating system "timer" (41); a weight checking system of the food to be cooked; a nearness sensing and identifying system of authorized users and utensils to operate the stove; a sound and/or visual alarm system; a voice synthesizer system associated with the other systems. The stove also includes an auxiliary battery back-up supply (8) a pre-heating system (H) for the oven (4); a temperature programmer (42) for the oven; an internal temperature measuring system (TR') for the oven; a variable programming system (46) of time× temperature; an automatic activating system (53) for a stove exhaust fan; and a bar code scanning system, for automatically programming the variable parameters of time and temperature.

19 Claims, 10 Drawing Sheets

FIG. 4b
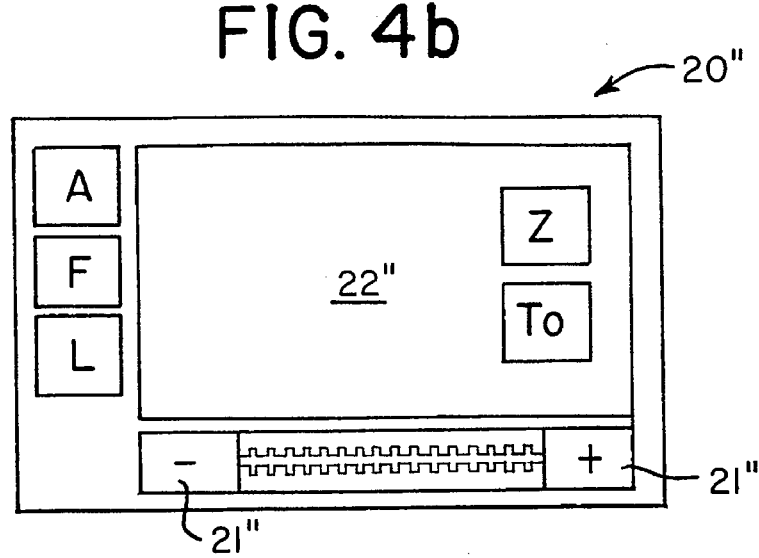
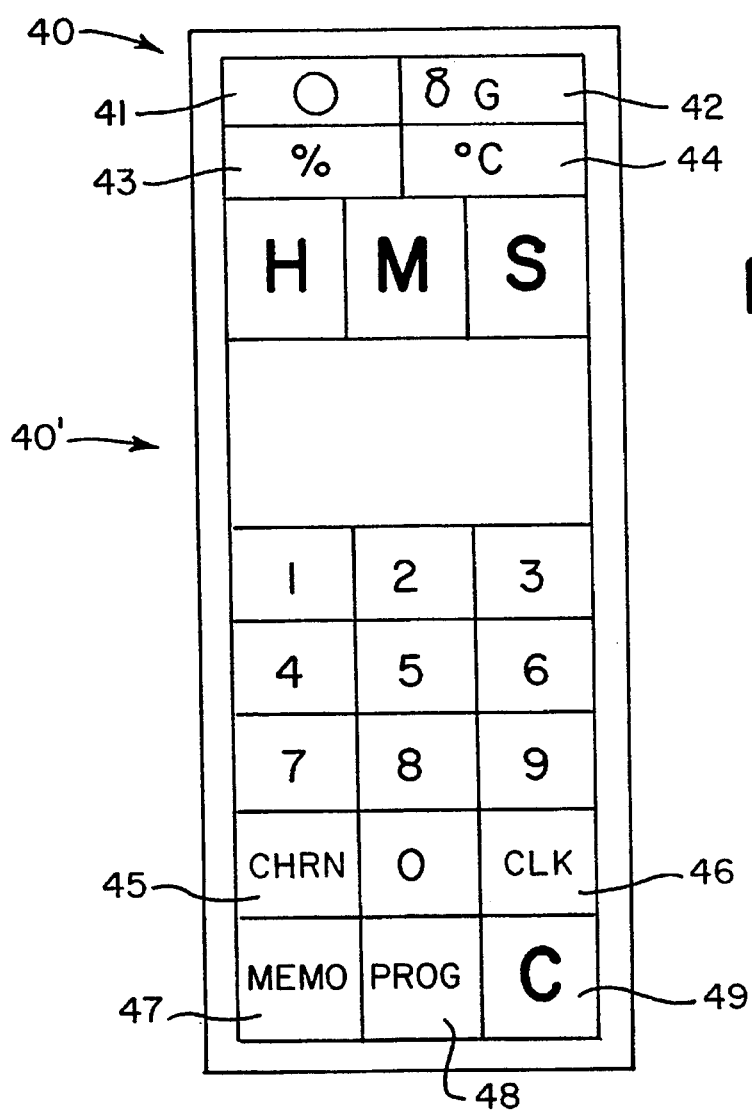
FIG. 4c

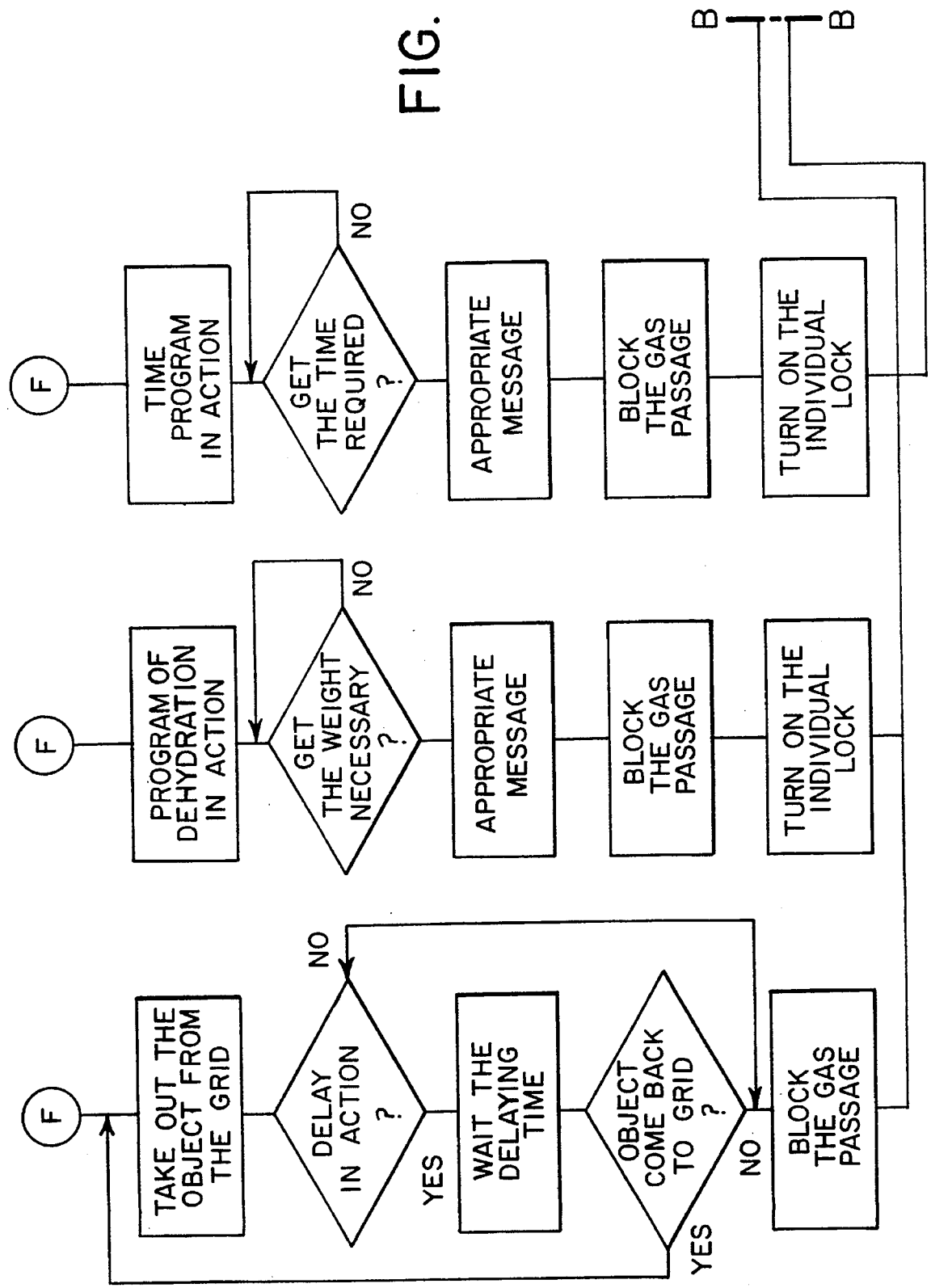

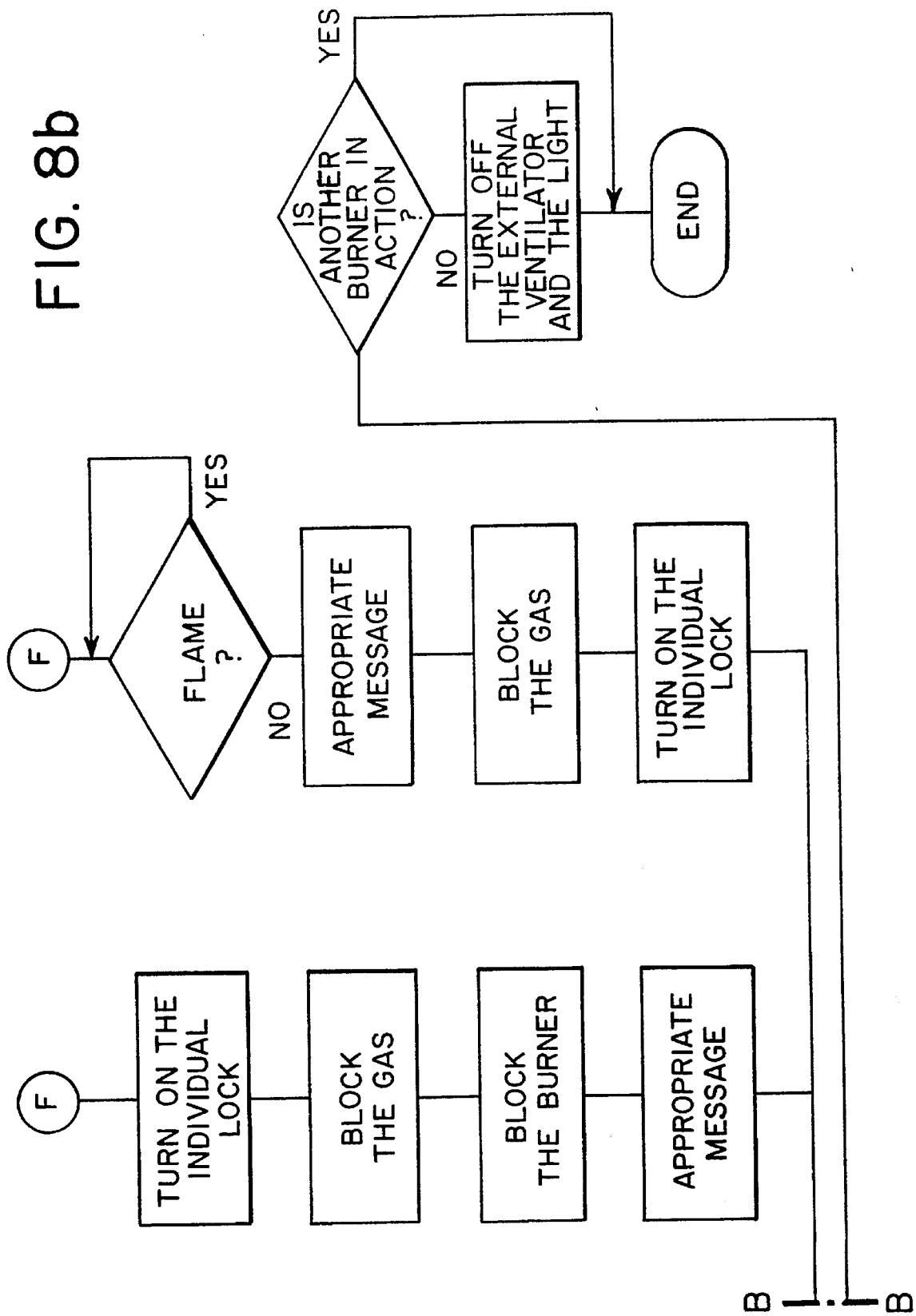

AUTOMATIC CONTROL STOVE

BACKGROUND OF THE INVENTION

This invention relates to a stove with automatic control, more specifically an automatic and intelligent stove, that provides for a more practical, secure, rational and efficient use.

It is known that standard stoves basically have a burner set linked to a gas conductor network and also a flame burner ignited by an electrically generated spark.

Actually, technological improvements related to stoves have been very simple and inefficient in terms of their specific function, that is, heating food.

The relatively few technological improvements applied to stoves are directed to the starting operation and not specifically to the heating of containers of food.

Even the most technologically advanced stove still presents disadvantages in terms of safety, economy and operational rationalization, and does not guarantee the sensory aspects (smell, sight, texture, color, taste) and food nourishment value.

The use of a computer to automate the procedures of food preparation is disclosed by J. Carl Goodhouse in Brazilian patent No. 3889,875 granted on Jun. 17, 1975, where the cooking time is automatically set in terms of weight, cooking degree (well done, medium, rare) and a factor for each meat type, always considering a fixed cooking temperature.

The current invention is not restricted to meat preparation. It provides for programming cooking via variable parameters of temperature, dehydration degree, vapor and weight, controlled by a computer. This permits automating all types of food preparation in order to provide food with total quality, defined as: delicious, nourishing, variable and easy to be prepared. This invention not only controls the oven, but also all the stove burners, and the characteristics of the automatic control. This allows a better interaction with the user, protection against improper use, defects, violations, and thus provides comfort and safety. The stove can also be manually programmed via a numeric keyboard or remotely from a distance by telephone, computer program, CD ROM, ROM card, tape or OCR-Scanner, or any other media or storage system that uses data storage (procedure information). All these characteristics and benefits are discussed below.

OBJECTS OF THE INVENTION

One object of the invention is to supply a stove with an automatic control that brings high security to the user avoiding gas exhaust, improper operation or the burning of food during its preparation.

Another object is to supply the stove with an automatic control that limits its use to qualified persons, avoiding non-authorized use, such as by children.

One more object is to supply the stove with an automatic programming control, allowing a rational, fast and orderly use of the stove.

BRIEF DESCRIPTION OF THE INVENTION

The objects mentioned above and others are obtained with the stove fitted with an automatic control for the basic flame operating system. A pan is rested over the oven or burner grid together with support subsystem sequences integrated with a basic system that warns of all the stove operational variants (temperature, time, dehydration degree, vapor percentage and food or ingredients weight). The support subsystems include a flame sensor system; timer; a "weight" checking system of food to be prepared; a nearness sensor system and an identifier of utensils and persons authorized to operate the stove; a sound and visual alarm system connected to the other subsystems status; an auxiliary electrical feeding system; an oven pre-heating system; a water vapor supplier and regulator for the oven; a system to measure the temperature of the oven; a variable programming system (time×temperature×vapor×dehydration degree) to prepare the best food; a system based on a bar code scanning system that automatically programs the stove with variable parameters of (time×temperature×vapor dehydration degree); an automatic operating system of external ventilation and light focus over the burner table.

BRIEF DESCRIPTION OF THE DRAWINGS

The current invention will be more understandable with a detailed description referring to the appended drawings where:

FIG. 4b is a front view of the individual control panel for the plate of the stove table;

FIG. 4c is a front view of the numeric keyboard of time, temperature, and dehydration degree of the oven foods programmer;

FIGS. 7a, 7b, 8a and 8b represent, respectively, the functional block diagram of the inactivity operating condition of the burners.

DETAILED DESCRIPTION OF THE INVENTION

Figure 1:
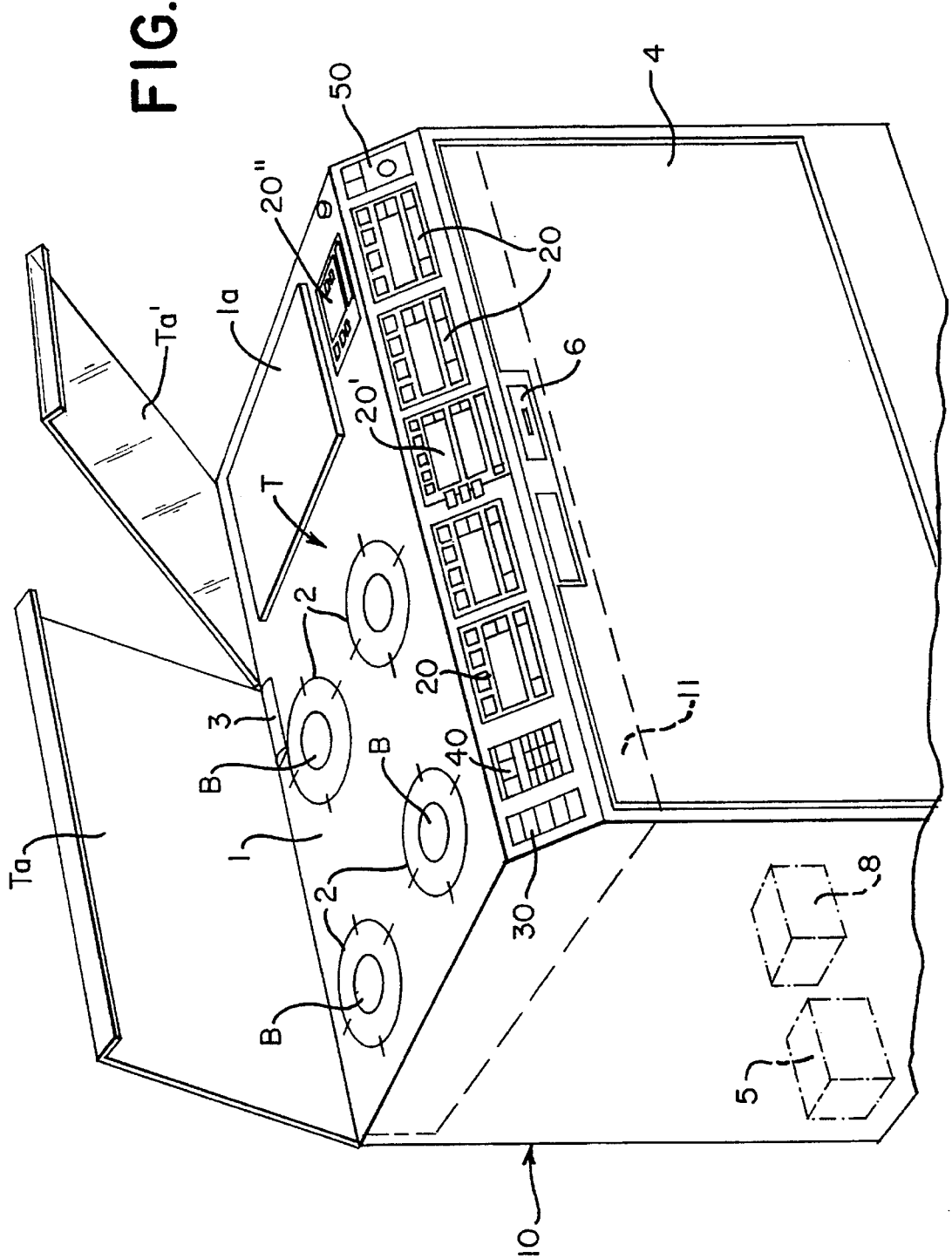
FIG. 1 represents schematically a view of a part of the automatic control stove of the invention.

According to the drawings, the automatic control stove, object of the current invention, has the following features: a housing 10, which, has set in its upper surface a plurality of burners B, each of them set under a support grid 2, where the pan or another appropriate utensil will rest for food preparation.

Over the burner table 1 there additionally is a plate 1a to directly grill the food.

On the top of burner table B, there is a radio frequency receiver 3 that detects the nearness and identifies a corresponding transmitter of radio frequency energy, not illustrated, attached to the utensil or utensil set appropriate for use with the stove.

On the front of the housing 10 is an individual panel 20 for each burner 1, a panel 20' for the oven burner 4 and a panel 20" for the grill plate 1a.

All of the control panels defined above are electro-electronically linked to a central processor circuit 5 that is responsible for all of the stove automatic operations.

This central processor circuit 5 is responsible for all the electro-electronic linking of all systems and functions, which in turn operates electro-mechanical devices that operate the stove partially or completely.

The stove with automatic control is provided with a nearness detector composed of a radio frequency system. The system has a transmitter and a receiver 3, the receiver 3 being mounted in the housing 10, more specifically over the burner table B, and the transmitter is mounted in a form which may be removable, next to the pan table or in one or more proper utensils for preparing the food. The transmitter can also be mounted in removable form, for instance, as a bracelet to be used around the user's wrist or as a necklace to be used around the neck or located in the user's apron.

Figure 2:
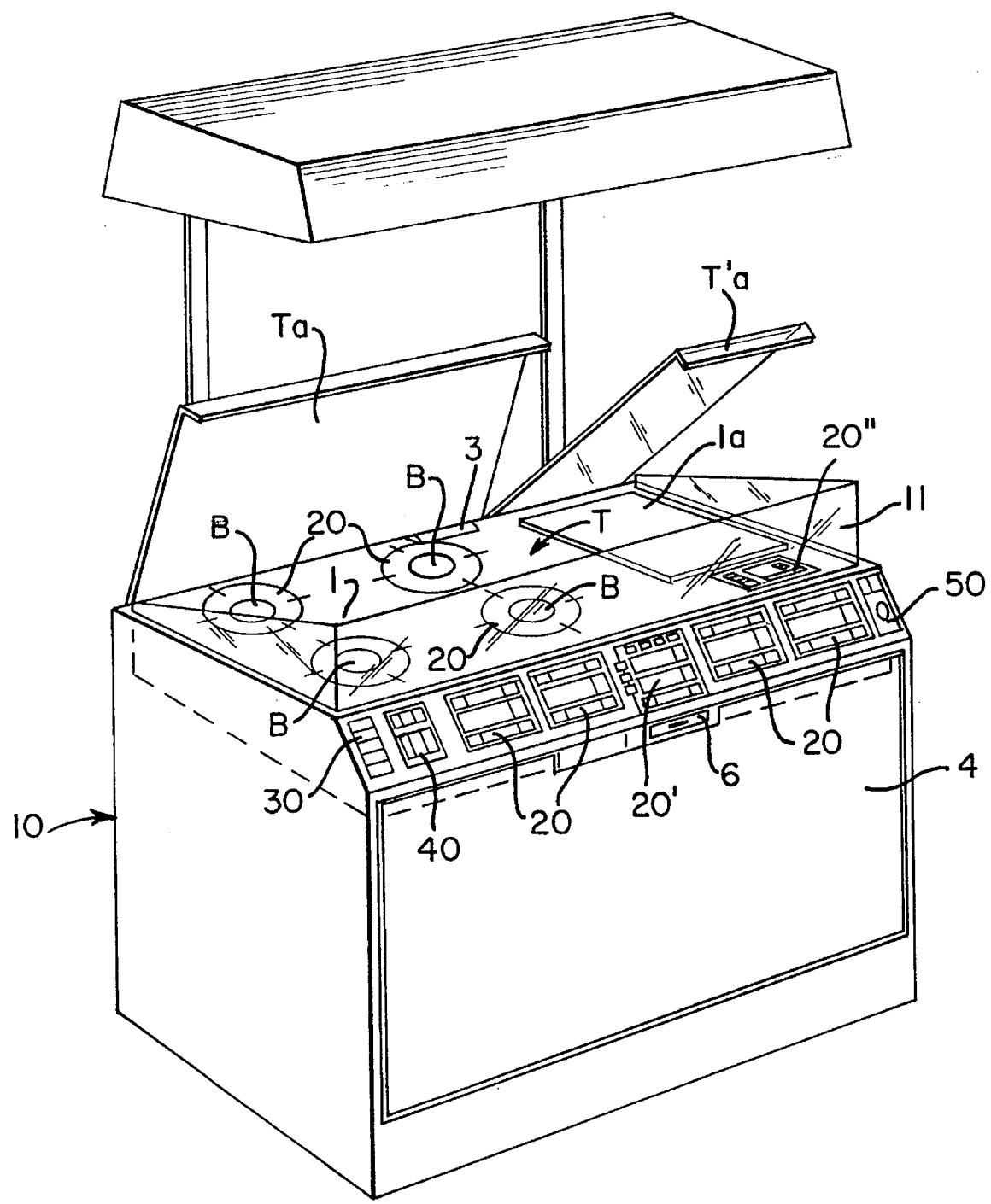
FIG. 2 represents schematically a perspective view of the stove, with an external ventilator and a glass shield in raised position.
Figure 3:
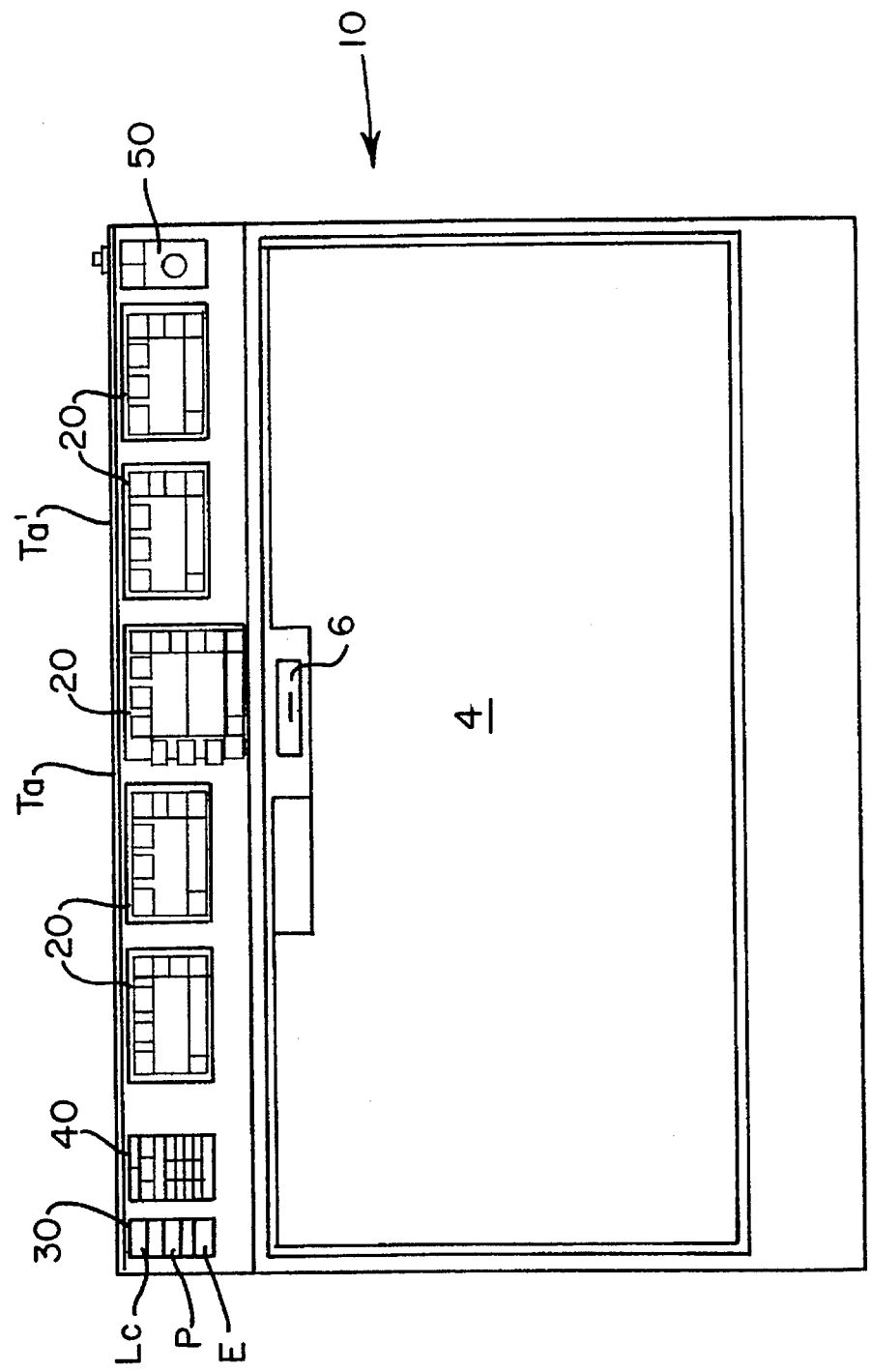
FIG. 3 is a front view of the automatic control stove.

The receiver 3 receives radio frequency signals, unique and distinct for each transmitter device, and determines whether or not the automatic ignition of the burner over which a pan rests is to take place. The determination to ignite a burner will take place always when the system recognizes concomitantly the user transmitter or transmitter on a pan placed over the burner grid required to be operated. If there is a lack of recognition of the proper user transmitter device, the system does not deliver the burner ignition and if the user tries to operate it inadvertently, a glass shield 11 will be raised from its position within the stove, as shown in FIG. 1, by any suitable mechanism, and will appear around the burner table T for security, as shown in FIG. 2.

When the transmitter is set in the pan it has suitable protection resistance to heat, water, soup and/or impact.

The radio frequency system is calibrated to act in a sphere of action at most 1 meter distance from the stove. Beyond this distance, the receiver 3 does not note the transmitter presence.

The transmitter devices mentioned have a microchip that preferably has a crystal that polarizes upon receiving electro-magnetic waves that is used for charging a battery.

The transmitter has a direct current source used to operate a micro-processor to produce a signal of one unique code for that device that is received and identified by the stove receiver. The stove itself triggers the transmitter devices to deliver radio frequency waves that are received by transmitter devices to sufficiently change direct current (d.d.p.) to deliver back another radio frequency signal that has a unique code for each transmitter, identified by the system.

There is a valve system (not shown) responsible for the gas passage and its outflow, individual for each burner B. This system is composed of two tubes with windows, one within the other. The inner tube is movable and the external one is fixed, so that by rotating one tube over the other, when the windows are completely aligned the most gas outflow occurs; and when this coincidence does not occur, the gas exit is completely sealed. The intermediate positions are responsible for gas outflow graduation (producing variable flame intensity). This system is manipulated by the central processor circuit 5 through an electric control or a solenoid (not illustrated).

Control of the burner flame graduation takes place through an operating device composed of two keys 21 and 21', with + and − symbols. This operating device is connected to the electric circuit of a valve system to provide an increase or decrease in the gas intensity and, accordingly, the flame. The graduation is set visually by LEDs.

Each support grid 2 of the burners B and oven burner 4 is unique and is connected to a balance system, where a detector device such as a strain or load cell, coupled to the referred support grid 2, determines the exact "weight" of the utensil rested over the grid. This balance system is responsible to start all the automatic operating process of the burner flame, as well as being responsible for flame extinction when the utensil is taken off the support grid 2.

Each unique support grid 2 is removable to make stove cleaning easy.

The automatic control stove also has a battery for auxiliary power to start the automatic operation when the main power supply fails.

The stove 10 also has a flame sensor F that works as a security device. It detects the presence or lack of flame. If the flame of one burner B switches off, the flame sensor sends a signal to the control center and this orders the valve system to automatically stop the gas supply to the respective burner 1.

Figure 4:
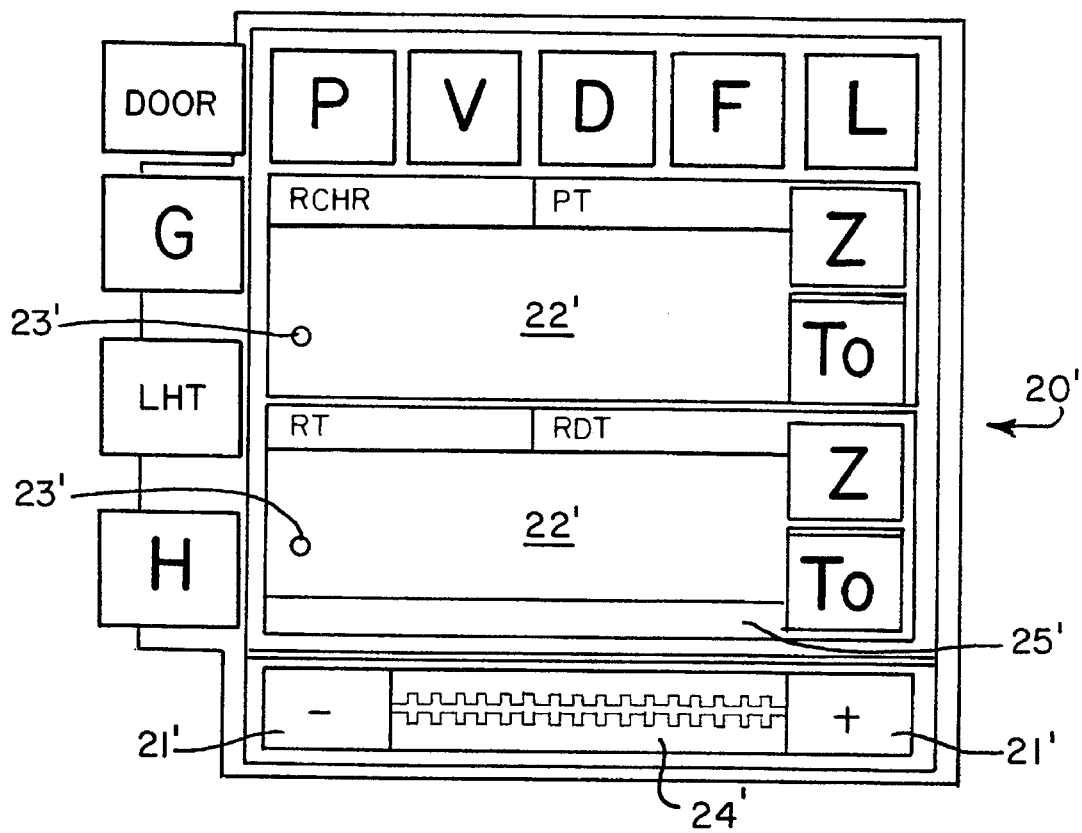
FIGS. 4 and 4a are respectively front views of the individual control panels of the oven and of each of the stove burners with automatic control.
Figure 4A:
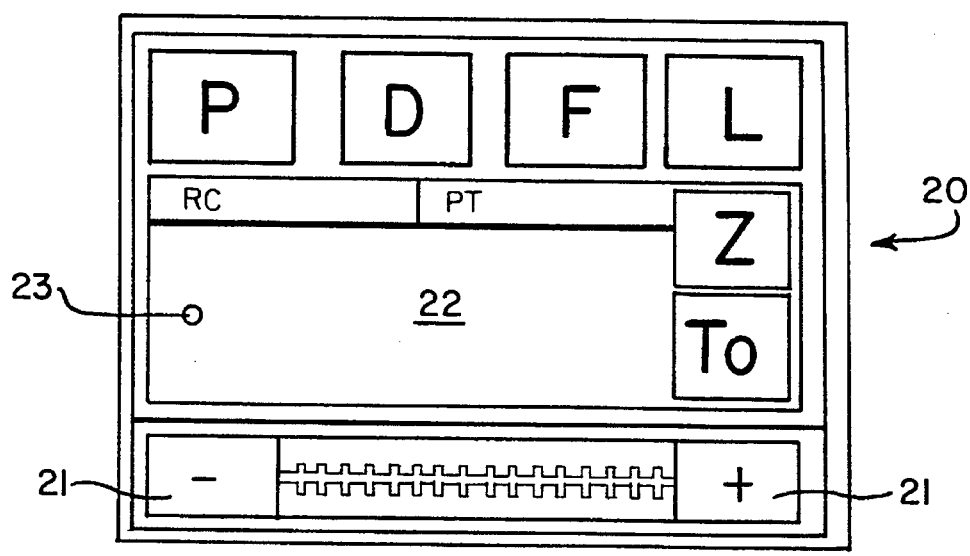
Figure 5:
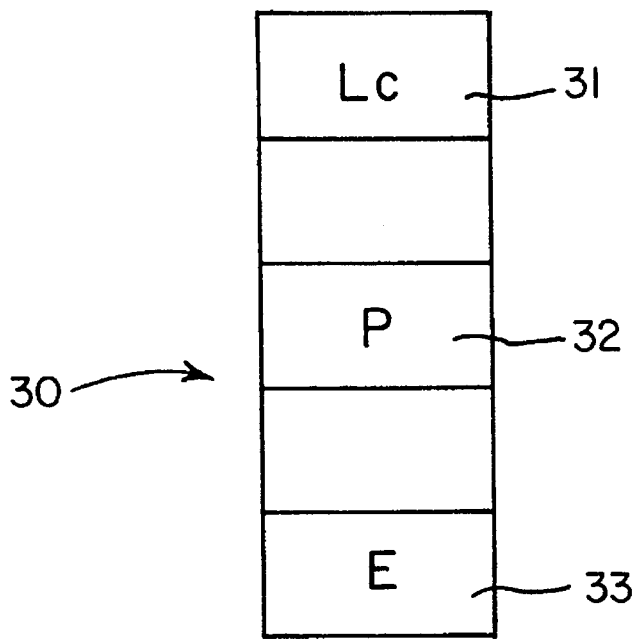
FIG. 5 is a view of the "master" control panel.
Figure 6:
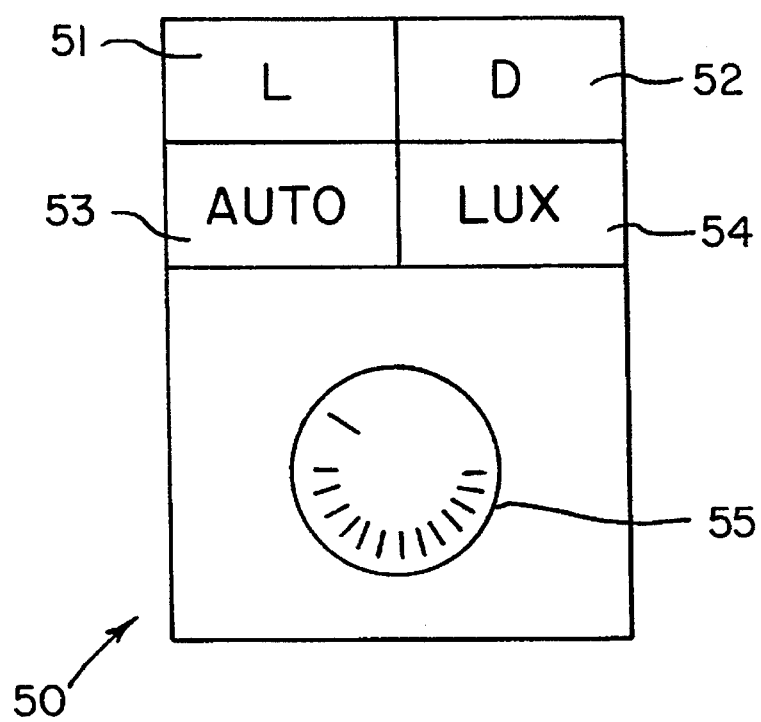
FIG. 6 is a view of the operating external ventilator and the light control for over the burner table.
Figure 7A:
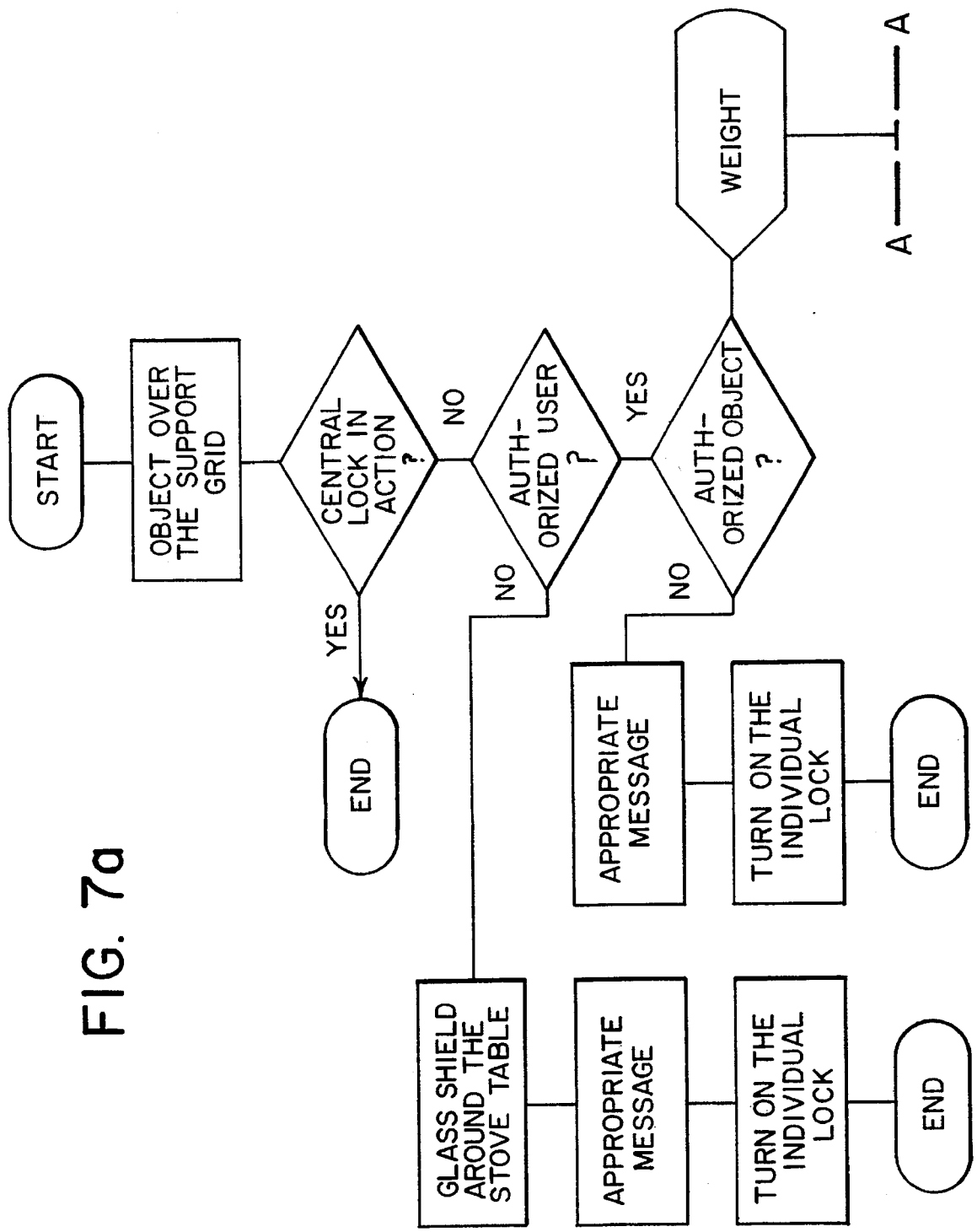
Figure 7B:
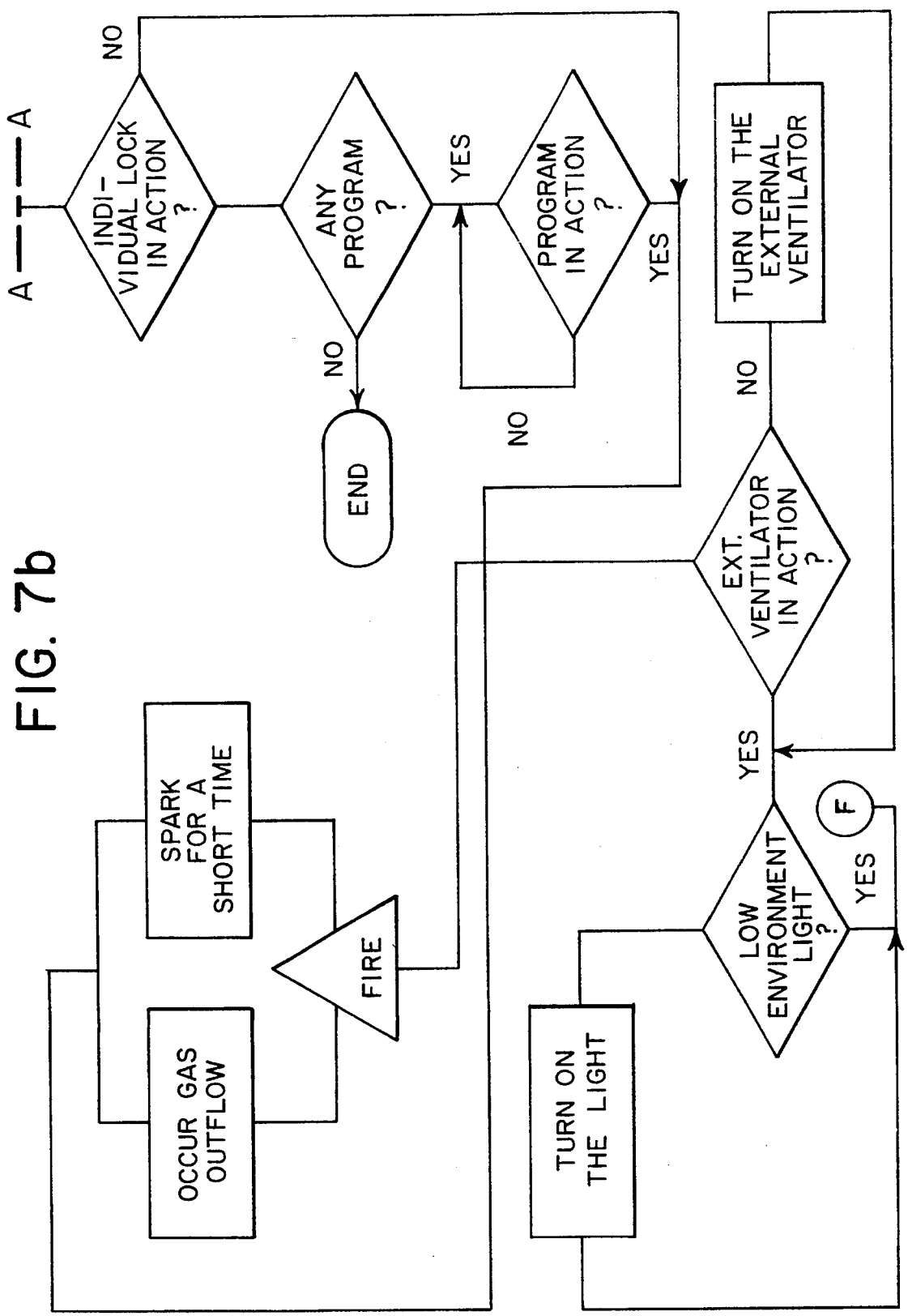

While the gas supply is suspended, an illuminated alarm is outlined in the respective burner's individual control panel 20 and an alarm is sounded (beep tone or voice synthesizer). Afterwards, the control center automatically activates an individual lock L. The individual lock L has its operating button set on each burner control panel 20 and the over burner panel 20', illustrated in FIGS. 4 and 4a.

Basically, each individual control panel 20 and 20' has a digital display window 22 and 22' to balance checking with zero Z and total (To) buttons. Each panel 20 and 20', besides having individual lock L and programming buttons, zero Z and total (To) buttons for the digital displays 22 and 22', also has a vapor button. Panel 20' (oven panel) displays an illuminated symbol F linked to the flame sensor, an operating button "under programming" P and a delay button D. This is responsible to operate a re-read of time that allows setting of the time that a pan can remain off of a support grid 2 without switching off the burner B.

Similarly, a master control panel 30 is connected to the central processor circuit 5 that is located in an appropriate place within the stove.

The individual lock L, operated by a key of the control panels 20 and 20', is a system that does not allow flame occurrence even when the weight of a pan is resting on the grid 2 of the burner B.

To rest a pan holding food already prepared on the grid 2 of a burner 1 without flame presence, one simply activates the individual lock key L.

This system connected to the command center can start the electric circuits, already mentioned, and then operate the gas supply valve system to switch off the flame, as soon as the individual lock L is activated, or in "weight" presence, the burner flame does not occur.

A central lock blocks feeding of the gas, completely stopping the stove operation 10. This system is operated by a central lock Lc key set in the master control panel 30, and hinders the gas passage by a pressure measuring device. It lowers hood Ta and Ta' of the stove following the inhibition of the network electrical supply and the alternative electrical supply back up system, and both operations are ordered by central processor circuit 5.

The pressure measuring device, not illustrated, functions to measure decreasing gas pressure in the entrance tube of the valve's system (main tube), activating the illuminated P key of the master control panel 30. This indicates the imminent need to change the vessel, or warns of problems in the street gas supply.

A device for measuring the amount of gas that remains in the vessel (if the stove has a GLP supply vessel), makes the system deny or not program the start of any of the burners. If the gas in the supply vessel is not sufficient, the illuminated key P of the master control panel 30 will switch on and a beep tone is sounded (or a voice synthesizer message is played) to notify the user of the need to change the supply vessel before starting the programming.

This measuring device operates based on information from a pressure sensor device set in the valve system entrance (main tube) and an analytical balance located below the gas vessel, that reveals, for instance, when a load vessel, 13 k capacity (commercial standard) is 5 k, or if it is close to empty. Arranging these two information sources informs the decision system if there is or is not sufficient gas to satisfy the required programming set by the user.

The pressure sensor can also hinder the gas passage through a solenoid controlled valve before it reaches the valve system. Such function is activated by the central lock.

The alarms are of both the sound and visual types that work in different ways, as shown in the following description: upon flame presence with gas outflow in a burner B the illuminated symbol F key in the control panels 20, 20' and 20" is switched on, or in case of lack of flame with gas outflow in the burner B, the F key flashes for 10 seconds, while a sound alarm or a voice synthesizer message is sounded; in case a lack of commercial electrical power supply occurs, the back up power supply system switches on the illuminated symbol E of the master control panel 30 and a beep tone or a voice synthesizer message is sounded twice; when a decrease in the gas pressure occurs, the illuminated P key of the master control panel 30 is switched on, a beep tone or a voice synthesizer message is sounded three times; and when using the delayer, the illuminated delay button D of the control panels 20, 20' and 20" is switched on, a beep tone or a voice synthesizer message is sounded only once; at the end of the pre-set cooking an illuminated P key (timer) flashes four times and a beep tone or a voice synthesizer message is sounded twice.

The burner oven 4 has a pre-heating system H that allows, with the oven completely empty or the weight balance zeroed, activation of the flame for a certain period, allowing the oven pre-heating to be effectively in use. Such a pre-heating system H is activated by the H key located in the individual burner panel of the oven control 20'.

The individual oven burner control panel 20' has a digital display window 22 as a checking weight key (for the second grid), plus a set of zero Z and totalizer (To) keys. Oven control panel 20' has an internal light command key LHT, one pre-heating system H control key and a grill key G responsible for the heating of the oven burner 4 internal rotary spit, a vapor V key to indicate that the oven is using water vapor to prepare the food, and also a DOOR key responsible for the electrical operation of the open oven door.

The pre-heating system H can be deactivated any time when the oven door is opened. When the pre-heating system H is activated, the delay D key is inhibited.

The pre-heating system H also activates an internal oven ventilator.

Inside the oven burner 4 there is a thermometer responsible for checking the temperature that can be read-out through a liquid crystal display 22' of the oven control panel 20'. In the same panel 20', there are the flame intensity determiner keys 21 (+ and −) and also on the panel is a numeric keyboard 40, that is a digital programmer device for time, temperature, dehydration degree and vapor percentage.

The temperature programming of the oven 4 is obtained following selecting the temperature as shown on the LEDs 24' and setting the flame intensity on the oven control panel 20'. The temperature digital programming is obtained via programming by the numeric keyboard 40.

The oven control panel 20' offers the following information for a more accurate control of the oven internal temperature. The RdT (Required Temperature) is the one the oven is to reach for best food preparation. The RdT can be programmed via digital programming or in an analog way. The RT (Real Temperature) is the oven internal temperature measurement, taken second by second.

The oven 4 is activated when an oven utensil is placed on one of the oven grids and when the oven door is completely closed, as long as the referred utensil or its user is authorized to use it, that is, they have the respective transmitters of code via radio frequency.

When the conditions mentioned above are filled there will be, besides the flame automatically operating, automatic operation of the internal ventilator. The oven 4 has a switch in its door that is connected to the control center 5 and is responsible to limit the flame activation until total closing of the oven door.

The internal ventilator mentioned above is responsible not only to circulate the gas in the oven, but it also avoids dish odor impregnation when two or more dishes are heated at the same time. It also eases the oven internal cleaning, because the exhausting avoids the accumulation of smoke and dripping from food preparation.

The oven 4 can be, alternatively, divided in two distinct compartments (upper and lower), and can in this case operate in response to different programmings. The oven 4 has its burner B switched off automatically when the door opens except when one only opens the door for checking, so, in this case, it is necessary to activate the delay button D that will keep the flame on for a short period of time. After this interval, if the door is not shut, the flame will extinguish and only the individual lock L of the oven control panel 20' will be activated. When the oven door is completely open it automatically activates the DOOR key of the oven panel 20' or it only allows for manual opening through a pressure brake.

The timer function is obtained using only one programmer device. This programmer device is a numeric keyboard 40 (FIG. 4c), with a display for user visualization, and has a visor (above it). Numeric keyboard 40 has the following keys: timer 41, temperature programmer 44, dehydration programmer 42 and a vapor percent programmer 43.

There is also a key referring to a clock (CHRN) 45 to measure the required time of flame presence in any burner. This permits the user to know the right time for cooking during the preparation of his recipes. This function is activated by the flame sensor of the first burner to be operated, after starting the clock (CHRN) 45 key. The clock starts when the individual lock L is switched on.

There is also a clock key (CLK) 46 that updates the current hour being displayed in the digital display while the device is not being used.

For the digital programming of the oven internal temperature, a device with numeric keyboard 40 for activating the temperature programmer 44 is used. The required temperature, that varies from 60° to 300° C., is determined through a keyboard. The chosen temperature will appear in the "display" when the key (PROG) 48 is activated and the choice will disappear from the numeric keyboard "display" 40 which will return the current hour and will be changed to the "display" of oven control panel 20' in the reserved blank RdT (Required Temperature). Now the oven 4 will automatically heat at its (RT) (Real Temperature) until it reaches the RdT selected during programming.

To set the current time, the user activates the CLK key 46 of the clock. When this occurs, the "display" will flash (or switch on or off). The clock is set by activating the key H for the corresponding hour digit(s). The same procedure is used for M minutes and S seconds.

Upon re-activating the clock CLK key 46, the hour programming is set thereby stopping the flashing. This operation finishes the programming of the current time.

The clock-timer is activated when one wishes to determine the ideal time of flame production to obtain the best result for a recipe that is being prepared. By measuring the time one can take note of the elapsed cooking time when it is desired to repeat such recipe, using the same time (the time programmed via timer 41) to get the same result (the same quality).

To do so, the clock 45 (CHRN) key of the device with numeric keyboard 40 and then the key P that indicates "under programming" of the individual control command 20, 20' and 20" of the burner required to use are activated. When the F flame key indicates the presence of flame in the burner B, it activates the chronometer that is set in the display of the individual control 20, 20' and 20" of that burner B, in the reserved space to RC.

When the time required by the user for its recipe is achieved, the key L indicates individual lock or removal of the pan over the grid and will lock the chronometer, showing in the display the chosen time. The hood (Ta) is raised every time the system is under operation and is lowered over the burners B every time the central lock Lc of the control master panel 30 is activated.

The hood is divided in two sections, (Ta) and (Ta'), one for the burners B and the other for the plate 1a over the burner table T. A glass hood (Ta') of the plate 1a has a different activation, according to the description below (FIG. 4b).

The plate 1a, different from the other burners B, is activated automatically with the "weight" over the support grid 2 by an authorized person or utensil and will not use any utensil because the food to be heated goes straight onto the plate 1a.

In this situation, the delay D key of the individual control panel 20" is changed by activating the A key, responsible to deliver gas and cause the electrical ignition flash that will produce combustion under the plate 1a. Such combustion and its respective flame will be confirmed by the flame sensor causing illumination of the F key of the individual control panel 20". The plate 1a does not have a timer function (indicated by "P" in the other panel), but keeps the individual lock L function.

To switch off the flame under the plate 1a, the user again activates the key A of the panel 20" which stops the gas feeding. The flame detector key extinguishes, confirming the operation. Afterwards, the glass hood (Ta') lowers straight over the area of plate 1a, for about 15 minutes, the time necessary for the plate 1a to get cold and achieve the cleaning. This process is done for safety to avoid people being burned after use of the plate 1a.

If the user wants to use the plate 1a again, before the 15 minute period, he activates the A key. The glass hood (Ta') will raise automatically and the process will be re-started.

The glass hood (Ta') can have its activation controlled by a numeric code password, via numeric keyboard 40 and then executed only by an authorized person. Another password can be put in the memory, if the user loses his authorized bracelet.

The glass hood (Ta') has the ability to lower after using the plate 1a, but it is not used for support grid 2 of the other burners B. For security, in this case the grid is made up of low thermal conduction material that cools rapidly after being heated by the burner B flame.

The activating operation over a required time is programmed in the numeric keyboard 40. The user then chooses the burner B that he wants to use (it can be the oven 4) by the individual panel through the P programming key. In the beginning, the flame detected by the flame sensor will start the programmed time into a regressive count. If there is already flame in the burner table T or oven 4 that one wishes to program, the P key itself when programmed, activates a regressive count.

To accomplish time programming in the device with numeric keyboard 40, the user a) activates the time programmer key 41; b) chooses the key H (hour), and then pushes the required hour (for security step the user can program 1, 2, 3 or 4 hour), the programmed hour will appear in the display 40'; c) chooses M key (minutes) and then pushes from 1 to 60; the programmed minutes will appear in the display 40; d) chooses the S key (seconds) and then pushes from 1 to 60; the programmed seconds will appear also in the display 40'. After choosing time, the user activates the programmer (PROG) key 48 and the choice will be frozen in the display 40, the user then pushes P of the individual control panel 20, 20', that he wishes to program. In the display 22 and 22' of this panel will appear the programmed time PT, as the regressive one RC, when the operation is started. After starting the operation, the "display" 40' of the numeric keyboard 40 returns to show the current hour. The timer programming operation can be restricted to minutes (M) key, zeroing automatically other parameters.

The programmer device 40 has also (MEMO) 47 and CL 49 keys. The (MEMO) key is used to keep in the memory a program the user will want to repeat when he wishes. To do so after activating the (PROG) key that finishes the programming operation, the user pushes (MEMO) key and then its identifier number. For instance, MEMO 1. Every time the user wants that program again, he just pushes MEMO 1, PROG and the program becomes available.

The CL key cancels the programming already done, if a mistake occurs in the programming operation.

To realize the ideal vapor percentage for preparing the food in the oven by the numeric keyboard 40, the user: a) activates the vapor percent programmer 43; b) pushes the required vapor percentage via the numeric keyboard 40 (the amount is from 1–100), where 0 (zero) means dry cooking and 100 (one hundred) the maximum vapor percentage; c) pushes the (PROG) key and the display will show the chosen vapor percentage. When activating the P key of the oven, it means "under programming", and a display automatically will light, indicating that the vapor programming is under operation, and it is not possible to open the oven door.

The food dehydration degree program occurs in the numeric keyboard 40, as follows. The user: a) activates the dehydration degree programmer G 42; b) he pushes "gram" amount, in the numeric keyboard 40, referring to the weight limit that is going to be lost during preparation of the food (and when this situation occurs the stove will switch off automatically or a new programming will start); c) activates the (PROG) key and the program is frozen in the display of the programmer advice. The program is passed back to the required burner, activating the individual panel P key. The information about the losing weight limit will appear in the display of the chosen burner or oven panel. The program starts as soon as the flame sensor detects flame in the burner that will be used.

Another way to program the dehydration degree is to program it by the lost weight percentage in relation to the real food weight (for instance: switch off the burner flame as soon as the food loses 8% of the initial weight). To do this the vapor percent programmer 43 is used after activating the dehydration programmer 42 and then, via numeric keyboard 40, the digit 8 and the (PROG) key are pushed. By doing this the chosen burner of the operation will switch off as soon as the food weight, that is being heated, loses 8% of its initial weight.

The numeric keyboard 40 also has the function to program the food preparation, according to a sequence of time, temperature, vapor, and dehydration degree parameter variation to obtain the best way to prepare the food. This function is useful when, for instance, it is desired that a frozen dish first defrosts, then starts to release vapor and finally is grilled, with a more intense heating and dries. Then, finishing the operations, the burner switches off because the food is ready to be tasted.

Therefore, according to (PROG) function, the dish or food mentioned could, for instance, defrost during 15 minutes in 50% percent of vapor at 60° C. temperature. It is then roasted during 40 minutes, in 90% vapor, at 130° temperature and finally grilled at 200° C., dry until the food loses 30 g of its initial weight (initially 2 kg). All of this process takes place automatically.

The variable programming parameters (of time, temperature and dehydration degree) is done activating the (PROG) key of the numeric keyboard 40 device and then the digit "1". This indicates the first program sequence of time, temperature, vapor, dehydration degree. The user then pushes (PROG) and the digit "1", to start the second program sequence. The procedure is the same for the 3rd, 4th, 5th, for as many sequences as is necessary. At the end, to pass back the programming to one of the stove burners (or oven), the user activates P key of the chosen individual panel program.

What was programmed is activated as soon as the flame F symbol of the oven 20' or burners 20 lights, indicating the flame operating. After the program is finished, the individual lock L key is activated, indicating the end of operation.

All variables parameters (of time×temperature×vapor× dehydration degree) can be more easily programmed through a simple bar-code scanning system that has the parameter information. After the optical pen scanning, the stove itself programs the scanned parameters automatically.

This optical pen, not illustrated, can be stored inside a stove drawer 6 that is beside the oven door lock for manual opening. The drawer 6 stores, besides the optical pen for the bar-code scanning system, bracelets used by users to operate the stove. The bracelet when placed inside the drawer 6 is inhibited from working. The drawer 6 can have its opening linked to a numeric code password, via numeric keyboard 40, to increase the security of oven opening so that it can be done only by an authorized person.

The bar-code can have information about the best way to prepare a specific food, and can be attached to the "dish" package made by a specialized company to supply the information to be programmed.

Information can be acquired in the "Control Individual Panel" 20 of the stove 10. For burner 1: a) in the left side of the digital display window 22 appears (RC), meaning regressive time count to have the flame extinguished (the chronometer, when activated, also appears in its position); b) in the upper right side of the digital display window 22 (PT) displays the programmed time in timer; c) burner 1 can be set for the ingredient weight if the X and (To) keys are correctly used; d) the detail button 23 when activated changes the information that is displayed in the center of the digital display window 22 to other information and can be weight, (RCH) (Regressive Chronometer), (PT) (Programmed Time), (CDD) (Current Dehydration Degree), (PDD) (Programmed Dehydration Degree). The flame intensity can be displayed via LEDs (analog scale).

Information can be acquired in the "Control Panel" 20 includes: a) (RCHR)—Regressive Chronometer; b) (PT)— Programmed time; c) (RT)—Real Temperature; d) (RdT)— Required Temperature; e) (CDD)—Current Dehydration Degree; f) (PDD)—Programmed Dehydration Degree; g) (VP)—Vapor Percentage; h) the information from two weight sensors—one for the upper grid and the other for the lower grid; and i) numerical (analog) display scale (LEDs) of the oven 4 internal temperature.

In the open control panel 20' there are two detail buttons 23' that change information that the user wants to have.

An "automatic programming" expression is always displayed on the liquid crystal screen when the oven is undergoing variable programming (time×temperature×vapor×dehydration degree).

The most common situations and its corresponding interpretation and also the independent actions are now described.

The proximity of the pan or bracelet (or apron or necklace) worn by the user when near the stove, activates radio frequency codes and combined with the pan "weight" present on the support grid 2 of the burner, starts the combustion process in that burner B.

This occurs as follows. After satisfying the three conditions mentioned before, that is, weight on the burner grid, presence of an authorized utensil, and a user for the operation having a transmitter in a bracelet (apron or necklace), the central processor circuit 5 activates the gas valve system and the ignition system. The selected burner B will be ignited by the electrical flash starting the combustion. The flame from the burner will be detected by the flame sensor, and that will activate an illuminated symbol F set in the burner's control panel 20 indicating the flame presence.

To switch off the flame, the pan is removed from its support grid 2. The weight sensor returns to zero and activates the central processor circuit 5, which stops the gas passage through the valve system. Upon sensing an extinguished flame, the sensor switches off the illuminated symbol F that indicates the flame presence. Placing a non-authorized (no transmitter) body over the support grid 2 of one burner B (or upon a non-authorized person attempting to operating the stove), does not permit flame activation because the proximity detector will indicate that a non-authorized object (or a non-authorized person) is present. This prevents activation of the central processor circuit 5 and a beep tone or a voice synthesizer will sound three times notifying the present user. At the same time, a glass shield will raise from the front and sides of the burner table. Also, an illuminated button of the individual lock L will flash three times, after which the lock system will be automatically activated for security reasons, keeping the individual button L illuminated.

When air circulation extinguishes the flame of a burner, the flame sensor notes the lack of flame and causes the central processor circuit 5 to activate the valve system stopping the gas flow. At the same time, a beep tone or a message voice synthesizer is sounded six times. The flame system indicator is flashed six times and then extinguished. After that, the individual lock system is activated for security reasons.

To work on or manipulate a pan outside the support grid 2 of the burner B without extinguishing the flame, the user activates the delay key D of the burner B control panel 20, this being illuminated during its use.

The D key that activates the delay system, defined by a time re-read, inhibits the balance system. This notifies a lack of weight indication to the central processor circuit 5 and this prevents the valve system from blocking the gas outflow to that burner B, avoiding flame extinction for a certain period of time (about 5 minutes) which is sufficient to manipulate the food. After the delay time is finished, if the pan is not restored on the support grid 2, the flame extinguishes. This function is not deactivated when the user no longer wishes to use this resource.

When the user wants to prepare a food for a determined period of time, the numeric keyboard 40 programmer device is used. This device is used to set the time in hours, minutes and seconds.

After the user chooses the burners B or the oven 4 to be used during the programmed time in its respective control panel 20 and 20', the user pushes the program P key.

The programmed time action will appear in the display of the individual panel 20 and 20'. The value of the time set is seen on the left part of the display while the right part will go to zero in a regressive way as the time passes. Accordingly, the user will have information about the pre-programmed time (PT) and how much time remains to finish the cooking (RC).

When the numeric keyboard 40 is not being used, the current hour will appear like a clock in the hour visor of the display 40'.

When after the cooking is completed and the user wants to keep the pan resting over the support grid 2 of the activated burner B, the individual lock L key is kept illuminated. This key influences the balance system, inhibiting the flame operating process, even with a "weight" present on the burner. The burner will be inactive, until the user activates a function by pushing the referred key.

When the user only wants to rest the pan over the grid 2 of a burner 1 with the lock activated, the flame action is inhibited and there is only a check of the "weight" of the pan content.

To improve the use of the weight sensor, the user must use the zero Z and totalizer (To) keys. If, for instance, the pan on the grid 2 is empty the user will know the value by activating the zero key. This value will disappear so any ingredient arranged inside the pan will have its true weight checked. It is possible to use the zero Z key again for checking the next ingredient and so on. The totalizer (To) key is used to check the total weight.

When the user wants to eliminate the weight value of the totalizer to obtain only the weight of all of the ingredients, during the initial process of the pan balance he activates the totalizer key and then the zero key. After that, a beep tone will be sounded indicating the value referred to in the pan is set in the memory and will not be considered in the final ingredients total.

When the gas supply vessel is to be changed, an illuminated symbol P in the master control 30 panel will switch on. This symbol is activated by a pressure sensor that detects the lack of required gas for a cooking program prompt to start, or detects a pressure decrease in the main supply pipe of the gas supply, between the vessel and the valve system. When gas from a central supply is used, the illuminated symbol P will indicate problems in the gas supply (e.g., low pressure).

When a lack of commercial electric power supply occurs, an illuminated symbol E will be displayed in the stove master panel 30 indicating activation of back-up energy, derived from battery 8 no break system being switched on. The back-up supply maintains the stove computer memory functions. After the return of the commercial power, the panel light will switch off. Also, the no break back-up system will be recharged automatically.

To block the stove from being activated, it is necessary that the central lock Lc key of the master control panel 30 be activated. Activating the Lc key will completely block the gas supply and afterwards the lowering of the stove top. It will also prohibit supply of the electric energy to the electric components of the stove system. Visually it will be apparent that the central lock Lc key is activated when there is a rearward retraction of its surface in relation to other keys of the referred panel.

When a user puts food inside the oven to roast, he opens the oven door, rests the oven authorized utensil with food over the oven grid, and closes the door. This procedure activates the oven burner flame.

The oven flame activation procedure occurs in the following way. If the user fills in the mentioned conditions and if the user is authorized through the transmitter bracelet (apron or necklace), the central processor circuit 5 will activate the system gas supply valves and the ignition system. There will then be the ignition of the oven burner gas with the electric ignition flash. When the combustion occurs, the electric flash will cease. The flame resulting from this combustion is detected by the flame sensor that activates an illuminated symbol F in the individual control panel 20' indicating the flame presence.

The regulating of a specific oven temperature to prepare a certain type of food is obtained through the use of the numeric keyboard.

When the user wishes to perform a brief inspection of how the cooking is going on, he activates the delay D key. This guarantees flame maintenance while the user opens the oven door and manipulates the food inside. Activation of the delay D key will keep the flame on for a certain period. After that time, if the oven door is not closed the flame will be extinguished, automatically activating the individual lock L system.

When the user wants to pre-heat the oven before its actual use, the pre-heating system H key is activated. Through activating the pre-heating system H key, there will automatically be flame activation for a certain period of time (about 10 minutes).

The pre-heating temperature can also be pre-programmed via numeric keyboard device 40. The pre-heating of the oven is blocked when the user opens the oven door. The pre-heating function can only be used with an empty oven.

The current invention as described is not exclusive to a stove using a street gas supply or a vessel gas supply. It also operates with electrical stoves, such as of the electric resistance type, incandescent resistance type, heat lamp irradiation, or magnetic induction.

When the stove is of the resistance type, the P key indication of the master control panel 30, which when switched on indicates pressure problems with gas supply in a gas stove would be changed to RI, indicating problems in the electrical resistance.

When the individual lock L of a burner is activated, the electrical resistance retracts inside the stove, away from the utensil so that this resistance does not continue to heat the food. For security reasons, the burner is always retracted in relation to the stove after its use.

When the source is a heat irradiation lamp, the P key of the master control panel 30 for the gas stove could be changed to an Li display for indicating problems in one of the stove lamps.

Using irradiation lamps or magnetic induction technology does not require other major system changes. An electric ignition system used in a gas stove is not required in the electric stove.

The flame F symbols of the control panel would be changed to an ON symbol to indicate that the stove is in use. And the + and − keys for flame intensity activates a controller of electric current to the irradiation lamp for controlling the heat intensity it delivers.

The current invention also automates the use of an external ventilator above the stove. The stove has a set of coupled ventilators. When the stove switches on, at the time the flame sensor senses any burner B of the stove being in use, the flame F detector activates the ventilator coupled to the system.

Preferably the ventilator activation is done via RF (Radio Frequency) including the wave emitter device that is already over the burner table T (the same nearness and user utensil identifier system); or alternatively, by electric spinning.

The ventilator control panel 50 has several illuminated control keys; one switch ON 51; other switch OFF 52; and another for automatic activation AUTO 53, that will switch on the ventilator when there is a flame present in any of the burners and will switch off when there is not; and finally, a light switch LHT 54, that activates a light to focus over the burner table T. The light can also be activated automatically according to the electric cell that will order the activation or shut off of the referred light.

In panel ventilator control 50 there also is a test socket 55, of the female connector type, that links the central processor circuit 5 to an external stove electronic analyzer, not illustrated. The analyzer analyzes and obtains information of all the stove electronic devices by performing an operation activation and, checking and verifying procedure. This analyzer is useful when a user wants to realize corrective or preventive maintenance in the electronic systems and stove electro-mechanical devices, in an automatic and fast way.

The central processor circuit 5, when connected by test socket 55 to a modem through a commercial telephone line allows the user, after giving an identification password, to remotely program and/or activate a stove (or oven) program. This is useful when for instance a user wants to start preparation of food previously left in the oven before going to work. For example, one hour before the meal time the user starts the operation from his office telephone through a numeric code. When the user arrives home to have the meal, the dish will be ready without wasting time.

In the same way when the control center 5 is connected via test socket 55 to a modem connection to a commercial telephone line it is possible to activate and realize checking and to verify operation of every stove device from a remote location by a technical assistance team.

This resource is useful when the technical assistance team wants to remotely check a problem that the client's stove is having, before the technical visit to determine which piece or component may have to be fixed or changed.

We claim:

1. An automatic stove comprising:
   at least one burner including a surface on which a cooking implement is to be placed;
   a computer for controlling operation of said at least one burner based on a cooking control program including at least one of burner operation time and burner heat quantity out-put;
   a transmitter/receiver system uniquely coded for the stove including a first part at said stove and a second part at a movable source including at least one of an implement or user of the stove providing interactive communication for the system part; and
   enabling means at the stove to recognize presence of an authorized second part uniquely coded to said first part of said transmitter/receiver system of the stove in proximity of the stove and in response thereto for actuating said computer to enable actuation and control of the said at least one burner in accordance with the cooking control program therefor.

2. A stove, according to claim 1 further comprising a support grid for each burner having a sensor that determines the exact weight of the utensil over the grid.

3. A stove, according to claim 1 wherein the second part of the transmitter/receiver is located on at least one of a cooking utensil to be used with the stove and a body part of the person authorized to operate the stove.

4. A stove, according to claim 1 further comprising an auxiliary battery backup system that recharges after use.

5. A stove, according to claim 1 further comprising a master control panel having a central lock button, a display to indicate decrease in the gas pressure and emergency gas feeding.

6. A stove, according to claim 1 further comprising a variable parameter programming system for programming at least one of cooking time, temperature, vapor amount and food dehydration degree of the cooking control program.

7. A stove, according to claim 1 further comprising two transparent tops operated by a central lock to open when a stove electro-electronic system is switched on.

8. A stove according to claim 1 including an oven and further comprising an internal regulating temperature system for the oven to be programmed via a numeric keyboard, to control automatically the oven burner flame intensity.

9. A stove as in claim 1 wherein said cooking control program operates in dependence on the quantity of ingredients in the cooking utensil and means for measuring the quantity of ingredients on a utensil on said at least one burner.

10. A stove as in claim 1 wherein
    said computer has a memory in which a plurality of cooking control programs are stored; and
    means for selecting one said cooking program.

11. A stove as in claim 1, further comprising:
    means for setting cooking control programs of the computer from a location remote from the stove.

12. A stove as in claim 11 wherein said setting means comprises a bar code reader.

13. A stove as in claim 1 wherein said enabling means further comprises a shield to be raised to restrict access to said at least one burner upon said transmitter/receiver system sensing the presence of an unauthorized second part.

14. A stove as in claim 1 further comprising:
    weight sensing means associated with said at least one burner to weigh the contents of a utensil thereon and to supply the weight information to the computer for adjusting the cooking control program as a function of the weight sensed.

15. An automatic stove comprising:

at least one burner including a surface on which a cooking implement is to be placed;

a computer for controlling operation of said at least one burner based on a cooking control program including at least one of burner operation time and burner heat quantity out-put;

a code transmitter/receiver system including a first part at said stove and a second part at a movable source including at least one of an implement or user of the stove providing interactive communication for the system part;

enabling means at the stove to recognize presence of an authorized second part in proximity of the stove and actuating the computer to enable actuation of the said at least one burner; and a support grid for each burner set over supports having a sensor that determines the exact weight of the utensil over the grid; and a control panel having a digital display with a zero button and a totalizer to provide information about food weight over the burner support grid, pre-programmed time and regressive time count, individual control lock, a detail button that changes the information; a flame sensor button, and a button that indicates the burner being programmed and a delay button that operates time re-read to delay the burner switch off operation when there is no weight sensed over the barrier grid.

16. An automatic stove comprising:

at least one burner including a surface on which a cooking implement is to be placed;

a computer for controlling operation of said at least one burner based on a cooking control program including at least one of burner operation time and burner heat quantity output;

a code transmitter/receiver system including a first part at said stove and a second part at a movable source including at least one of an implement or user of the stove providing interactive communication for the system part;

enabling means at the stove to recognize presence of an authorized second part in proximity of the stove and actuating the computer to enable actuation of the said at least one burner;

an oven;

an internal regulating temperature system for the oven to be programmed via a numeric keyboard, to control automatically the oven burner flame intensity; and a variable parameter programmer system (time×temperature×dehydration degree×vapor) to automatically control time and internal oven temperature, a food loss weight checking function to control dehydration degree and regulate the vapor amount to be introduced during the preparation of food.

17. An automatic stove comprising:

at least one burner including a surface on which a cooking implement is to be placed;

a computer for controlling operation of said at least one burner based on a cooking control program including at least one of burner operation time and burner heat quantity output;

a code transmitter/receiver system including a first part at said stove and a second part at a movable source including at least one of an implement or user of the stove providing interactive communication for the system part;

enabling means at the stove to recognize presence of an authorized second part in proximity of the stove and actuating the computer to enable actuation of the said at least one burner; and an atmospheric compensator system that modifies the cooking control program (time×temperature×vapor× dehydration degree) according to the current atmospheric conditions.

18. An automatic stove comprising:

at least one burner including a surface on which a cooking implement is to be placed;

a computer for controlling operation of said at least one burner based on a cooking control program including at least one of burner operation time and burner heat quantity output;

a code transmitter/receiver system including a first part at said stove and a second part at a movable source including at least one of an implement or user of the stove providing interactive communication for the system part;

enabling means at the stove to recognize presence of an authorized second part in proximity of the stove and actuating the computer to enable actuation of the said at least one burner; and alarm means for producing an alarm upon said transmitter/receiver system sensing the presence of an unauthorized second part.

19. An automatic stove comprising:

at least one burner including a surface on which a cooking implement is to be placed;

a computer for controlling operation of said at least one burner based on a cooking control program including at least one of burner operation time and burner heat quantity output;

a code transmitter/receiver system including a first part at said stove and a second part at a movable source including at least one of an implement or user of the stove providing interactive communication for the system part;

enabling means at the stove to recognize presence of an authorized second part in proximity of the stove and actuating the computer to enable actuation of the said at least one burner; and means for sensing at least one of pressure, humidity and temperature conditions external of the stove and supplying information relative to the sensed condition to the computer for adjusting the cooking control program as a function of the said at least one condition sensed.

* * * * *